(12) United States Patent
Hermant et al.

(10) Patent No.: US 9,285,174 B2
(45) Date of Patent: Mar. 15, 2016

(54) THERMAL ENERGY SYSTEM AND METHOD FOR ITS OPERATION

(75) Inventors: Brice Hermant, St Jean de Boiseau (FR); Christophe Royne, Pornichet (FR); Thierry Bouchet, Bouaye (FR)

(73) Assignee: DCNS, Paris (FR)

( * ) Notice: Subject to any disclaimer, the term of this patent is extended or adjusted under 35 U.S.C. 154(b) by 157 days.

(21) Appl. No.: 13/824,128

(22) PCT Filed: Jun. 27, 2012

(86) PCT No.: PCT/EP2012/062436
§ 371 (c)(1),
(2), (4) Date: Jul. 5, 2013

(87) PCT Pub. No.: WO2013/000948
PCT Pub. Date: Jan. 3, 2013

(65) Prior Publication Data
US 2014/0096519 A1    Apr. 10, 2014

(30) Foreign Application Priority Data

Jun. 27, 2011   (FR) ...................................... 11 01993

(51) Int. Cl.
*F03G 7/06* (2006.01)
*F28G 9/00* (2006.01)
*F03G 7/05* (2006.01)
*F28D 1/02* (2006.01)

(52) U.S. Cl.
CPC .. *F28G 9/00* (2013.01); *F03G 7/05* (2013.01); *F28D 1/022* (2013.01); *Y02E 10/34* (2013.01)

(58) Field of Classification Search
CPC ............. F03G 7/05; F28D 1/022; F28G 9/00; Y02E 10/34
See application file for complete search history.

(56) References Cited

U.S. PATENT DOCUMENTS

| | | | | |
|---|---|---|---|---|
| 4,170,878 A | * | 10/1979 | Jahnig | ........................ 60/641.7 |
| 7,536,869 B2 | * | 5/2009 | Inaba et al. | ................. 62/238.6 |
| 2002/0066555 A1 | * | 6/2002 | Mulder | ........................ 165/303 |
| 2007/0289303 A1 | * | 12/2007 | Prueitt | ........................ 60/641.7 |
| 2009/0294110 A1 | * | 12/2009 | Foust | ........................... 165/152 |

(Continued)

FOREIGN PATENT DOCUMENTS

CA    2635646 A1    12/2009

OTHER PUBLICATIONS

International Search Report for International Application No. PCT/EP2012/062436, mailed on Dec. 14, 2012.

*Primary Examiner* — Jesse Bogue
(74) *Attorney, Agent, or Firm* — Young & Thompson

(57) ABSTRACT

The present invention relates to a thermal energy system (1) that includes at least
one exchanger module (100, 200, 300) that includes at least one heat exchanger (110a, 110b, 210a, 210b, 310a, 310b), in particular two heat exchangers, each module including at least a first circuit (140a, 140b, 240a, 240b, 340a, 340b) for a first fluid traversing, in a regular mode of operation, through the heat exchanger in a main flow direction, a second circuit for a second fluid for exchanging thermal energy between the first fluid and the second fluid, and at least one pump (160, 260, 360) including a fluid drive device (162, 262, 362) for driving the first fluid in the main flow direction, characterised in that the drive device is arranged, along the main flow direction, upstream of the heat exchanger. In addition, the invention relates to the application of such a system in ocean thermal energy conversion systems.

17 Claims, 5 Drawing Sheets

(56) References Cited

U.S. PATENT DOCUMENTS

| | | |
|---|---|---|
| 2010/0139271 A1 | 6/2010 | Howard et al. |
| 2010/0147965 A1* | 6/2010 | Sedlak et al. ............... 237/13 |
| 2010/0205961 A1 | 8/2010 | Nagurny |
| 2011/0011570 A1* | 1/2011 | Levings et al. ............... 165/166 |
| 2011/0011572 A1* | 1/2011 | Nagurny et al. ............... 165/172 |
| 2011/0072816 A1* | 3/2011 | Ernst et al. ............... 60/616 |
| 2013/0327041 A1* | 12/2013 | Gaertner et al. ............... 60/615 |

* cited by examiner

THERMAL ENERGY SYSTEM AND METHOD FOR ITS OPERATION

The present invention relates to a thermal energy system including at least one exchanger module, which includes at least one heat exchanger. In particular, the present invention relates to an ocean thermal energy conversion system. In addition, the present invention relates to a method for operating such a system.

Such systems and methods are typically used in ocean thermal energy conversion systems, where, by exploiting the temperature difference between surface waters and deep waters, a generator is driven to generate electricity. For example, the temperature of surface waters may reach or even exceed 25 degrees Celsius, while deep waters, which are deprived of sunlight remain around 4 degrees Celsius at a depth of 1000 m.

Typically, this thermal energy system needs a very vast flow of warm or cool sea water due to the low efficiency of the system. In order to handle vast flows of seawater large sized heat exchangers are used. However, it is difficult to clean these heat exchangers.

For example, the use of a set of valves between the inlet and outlet of the heat exchanger causes pressure losses.

FR 2 477 278 A discloses a mobile cleaning device for a heat exchanger. This cleaning is carried out mechanically with the exchanger out of operation.

EP 1 486 264 A1 discloses an automatic cleaning device for a heat exchanger. Typically the heat exchanger described in EP 1486264 A1 relates to refrigerators.

Conventionally, plate heat exchangers for an ocean thermal energy conversion system are fed by a pump present in a collector, the latter opening into a pool that makes it possible to feed the heat exchangers. In addition, earlier installations have implemented pipes between pumps and exchangers and downstream from the heat exchangers. The location of a pump downstream from the heat exchangers requires a straight length of about five times the width or nominal diameter, which can be very restrictive with regard to the implantation and layout of platforms exploiting the ocean thermal energy conversion (OTEC); in fact, this operation requires high flow rates, and consequently considerably large pipeline widths (nominal diameters).

Moreover, known thermal systems use a mat filtration process, which is not suitable for offshore installations, particularly in view of space requirements and installation constraints. In addition, such mats induce significant pressure losses due to the small size of the filter surface.

The purpose of the present invention is to overcome the disadvantages of the state of the art, in particular to provide a thermal energy system that has superior efficiency and is easier to clean, while also reducing the frequency of cleaning of filters.

According to a first aspect, the present invention relates to a thermal energy system including at least one exchanger module that includes at least one heat exchanger, in particular two heat exchangers, each module including at least a first circuit for a first fluid traversing, in a regular mode of operation, through the heat exchanger in a main flow direction, a second circuit for a second fluid for exchanging thermal energy between the first fluid and the second fluid, and at least one pump including a fluid drive device for driving the first fluid in the main flow direction, the drive device being arranged, along the main flow direction, upstream of the heat exchanger.

The present invention makes it possible to increase the economic viability of ocean thermal energy conversion systems by maximising power output supplied in an arrangement that is less bulky, particularly because of the arrangement of the drive device upstream of the heat exchanger. For example, an installation in a pool makes it possible both to reduce the volume occupied by the system, but also to minimise the pressure losses associated with the implantation of pipes, in particular downstream from the heat exchanger. In addition, high flow pumps, for example, of a few thousand cubic meters per hour, require a low speed suction (for example around 0.8 m/s) in the case of installation in a pool.

In one embodiment, a distribution chamber is arranged, along the main flow direction, downstream from the drive device and upstream from the or each heat exchanger. For example, the distribution chamber makes it possible to distribute the first fluid to at least two heat exchangers. However, a distribution chamber can also be used in the case of an exchanger module with a single heat exchanger.

According to an advantageous characteristic feature, a suction pipe extends from the distribution chamber, the drive device being in particular arranged in this pipe.

In a particular embodiment, the suction pipe has a length that is less than 4 times its nominal diameter, in particular less than 3 times its nominal diameter, for example between 1 and 1.5 times its nominal diameter. In one embodiment, the suction pipe is substantially straight and/or opens into the reservoir for the first fluid. In this way it is possible to place the distribution chamber above the surface of the first fluid, while the suction pipe and, in particular, the drive device are immersed in the first fluid.

According to another advantageous characteristic feature, the distribution chamber is arranged at least partially, for example completely, above a reservoir for the first fluid. This makes it possible to obtain a thermal energy system with a reduced space requirements.

According to one advantageous characteristic feature, the pump includes a motor connected to the drive device by a motion transmission device, which traverses at least partially the distribution chamber. In one embodiment, the motor is arranged on the outside, in particular above, the distribution chamber.

For example, in one embodiment, the distribution chamber forces the first fluid to make a turn of at least 45°, for example at least 60°, in particular from a substantially vertical direction of flow into a substantially horizontal direction of flow.

In one embodiment, the reservoir for the first fluid is the layer of hot water on the surface of a pool and/or of the sea. For example, the reservoir for the first fluid has a depth of less than 20 meters, in particular less than 10 meters.

According to an advantageous characteristic feature, a filtering means is arranged, along the main flow direction, upstream of the drive device, in particular around the suction pipe, for filtering the first fluid that is suckable by the drive device, the filtering means extending in particular from the distribution chamber, for example up to the bottom of a reservoir for the first fluid. In one embodiment, the filtering surface of the filtration means is greater than 10 m², in particular greater than 15 m².

In one particular embodiment, the system may include at least two exchanger modules. For example, the at least two modules may have identical functions and/or characteristics.

According to another advantageous characteristic feature, the system according to one embodiment, is adapted to connect in series, in a cleaning mode, the first circuits of at least two exchanger modules in a manner such that the first fluid traverses through at least a first circuit of one of the exchanger modules in the main flow direction and traverses through at least a first circuit of another exchanger module in a direction opposite to the main flow direction.

The counter flow operation of a heat exchanger module allows for minimising the volume taken up by a possible addition of valves in order to operate in counter flow fashion, for example in a direction opposite to the main flow direction, by using the availability of another circuit performing the same function. In terms of flow rates involved, this makes it possible to minimise pressure losses induced by the implementation of the valves.

Moreover, this solution makes it possible, by way of a sequenced operation, to unclog the heat exchangers, like for example plate heat exchangers, and to only lose a little of the power generated by the system, because the flow of water having passed through the exchanger line of the first module could however continue to be used in the second module with the heat exchanger thereof. In addition, the shape of the plates in a plate heat exchanger do not allow, even with "anti-fouling" treatment, for cleaning the surfaces thoroughly, due to there being dead zones present. The solution presented in accordance with the embodiments of the present invention, make it possible, during the phases of counter flow operation, to sweep these dead zones. This obviates the need for cleaning the exchangers while the system is shut down, which would make an ocean thermal energy conversion system unsustainable on account of the frequent shut downs.

According to other advantageous characteristic features, at least one of the heat exchangers, in particular all of the heat exchangers, is or are of the plate heat exchanger type.

In a particular embodiment, an isolation valve is arranged, along the main flow direction, in the first circuits connected in series, downstream from the heat exchangers, in a manner so as to allow communication between the first circuits of the at least two exchanger modules.

According to an advantageous characteristic feature, each first circuit includes an outlet valve, by way of which, in the regular operating mode, the first fluid is discharged out of the respective exchanger module.

According to an advantageous characteristic feature, at least two modules have identical functions.

For example, in one embodiment, the first fluid is seawater.

The invention also relates to a method for operating a system according to an embodiment of the invention, the method including the following steps:
the driving, along the main flow direction, of the first fluid present upstream of the heat exchanger by the drive device;
the activation of a cleaning mode in which the first circuits of at least two exchanger modules are connected in series in a manner such that the first fluid traverses through at least a first circuit of one of the exchanger modules in the main flow direction and traverses through at least a first circuit of another exchanger module in a direction opposite to the main flow direction.

By using the presence of several modules, the pooling together of the first two circuits is carried out, thus enabling the heat exchangers of the other module to operate in counter flow fashion.

This method, by reducing the impact with respect to the layout and location and therefore the size of the platform, enables the carrying out of a cleaning operation of heat exchangers while in operation.

In one embodiment, the system needs at least two circuits having the same functions in order to be able to pool them together. The operation of the module of a system and/or a method operating in counter flow mode is seen to be slightly degraded.

According to another advantageous feature, the activation of the cleaning mode includes:
the opening of at least one isolation valve arranged in the first circuits connected in series, along the main flow direction, respectively downstream from the two heat exchangers in a manner so as get said first circuits to communicate.

According to other advantageous characteristic features, each first circuit includes an outlet valve, by way of which, in the regular operating mode, the first fluid is discharged out of the respective exchanger module, the activation of the cleaning mode including the closure, in each first circuit, of the outlet valve.

For example, in one embodiment, the method further including, in the cleaning mode:
the inactivation of one of the pumps associated with the exchanger modules including the first circuits connected in series, in particular of the pump associated with the module through which the first fluid traverses in a direction opposite to the main flow direction.

According to an advantageous characteristic feature, the method further including the following steps:
determination of the speed of the inactive pump
comparison of this speed with a predetermined reference speed, and
restriction of the speed of the inactive pump to the predetermined reference speed. The pump then operates in controlled reverse rotation.

In one embodiment, the cleaning mode is activated for a predetermined time period, in particular for a time period less than 10% of a period of activation of the regular operating mode, for example for a time period that is less than 5% of a period of activation of the regular operating mode.

In one embodiment, the first fluid is sea water.

In one embodiment, at least one of the heat exchangers, in particular all the heat exchangers, is or are a condenser.

In one embodiment, each exchanger module includes two first circuits each associated with a heat exchanger.

Additional characteristic features and advantages of the present invention will become apparent from the description provided here below with reference to the drawings and in the Annex which illustrate an example of the embodiment without in any way being limiting and in which.

Figure 1:
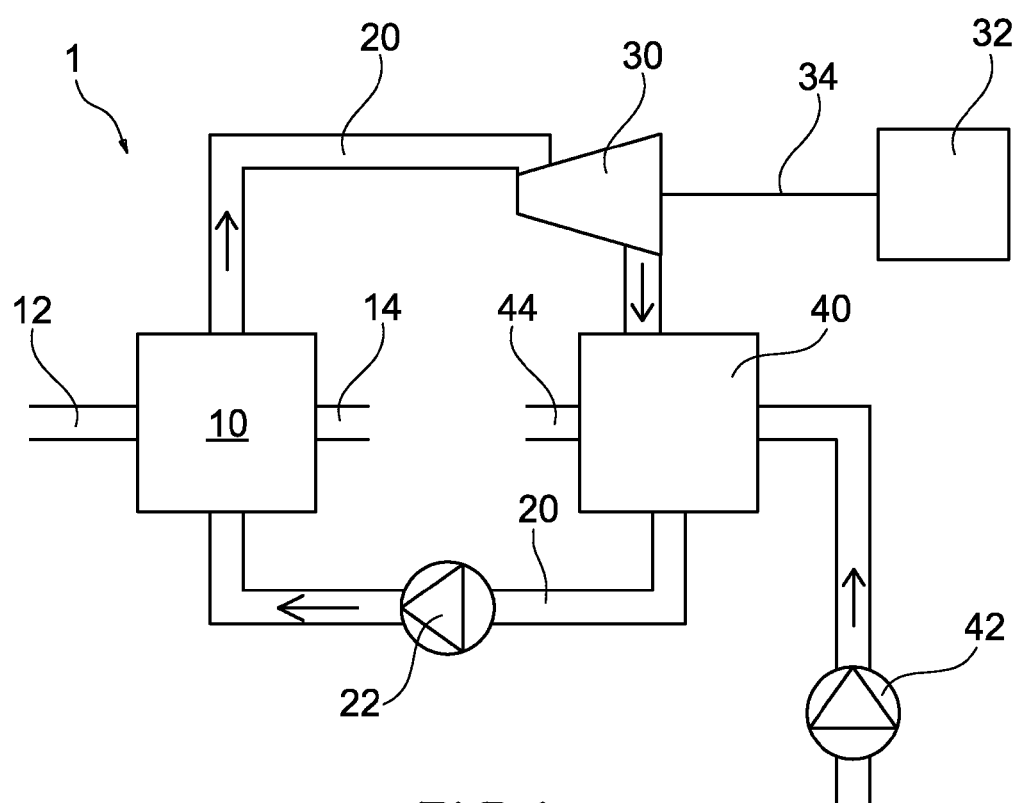
FIG. 1 is a schematic representation of an ocean thermal energy conversion system in closed cycle according to one embodiment.

FIG. 1 is a schematic representation of a closed cycle ocean thermal energy conversion system. Obviously, the present invention can also be applied to open cycle or hybrid cycle thermal energy systems. The thermal energy system 1 shown in FIG. 1 includes an evaporator 10 which is supplied with a hot fluid, for example surface sea water, by a supply pipe 12. The hot fluid is used in the evaporator 10 for evaporating a working fluid circulating in the thermal energy system 1 in a pipe circuit 20. The working fluid, for example ammonia, is driven in this circuit by a working fluid pump 22.

After having passed through the evaporator 10, the hot fluid is discharged through a discharge pipe 14.

The working fluid evaporated in the evaporator 10 is supplied to a turbine 30 which is connected to a current generator 32 by a shaft 34. In the turbine, the working fluid is expanded. Then the working fluid is fed to a condenser 40 so as to be condensed and subsequently fed by the working fluid pump 22 once again to the evaporator 10. The condenser 40 is supplied with a cold fluid, such as sea water from great depths. The cold fluid is driven by a pump 42 which feeds the fluid to the condenser 40. Subsequently this fluid heated through the exchange in the condenser 40 is discharged through a discharge pipe 44.

Figure 2:
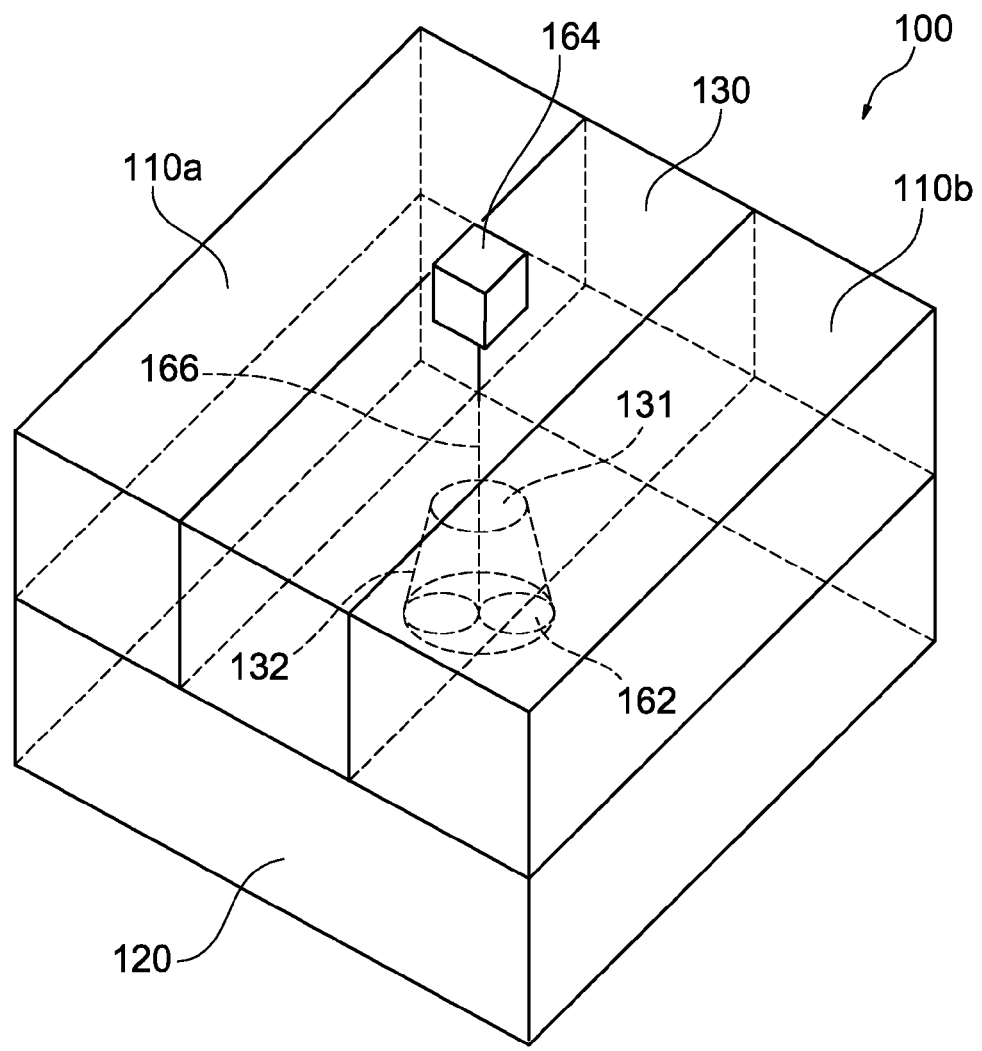
FIG. 2 is a schematic representation of a perspective view of a heat exchanger module according to an embodiment.
Figure 3:
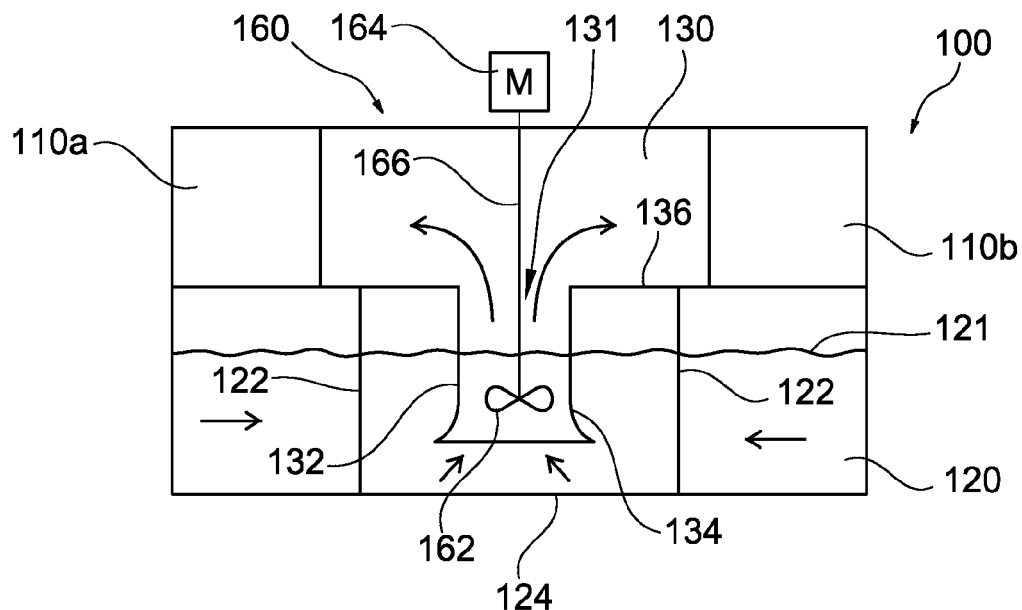
FIG. 3 is a representation, in cross section, of the exchanger module in FIG. 2.

FIG. 2 schematically shows an embodiment of a heat exchanger module 100 in a perspective view, and FIG. 3 shows this embodiment in a cross sectional view. The exchanger module 100 includes two heat exchanger lines 110a and 110b which are arranged above a reservoir for a first fluid, for example a suction pool. Other embodiments may include only one heat exchanger line, or include at least three heat exchanger lines. For example, the heat exchangers 110a, 110b may be a condenser or an evaporator of an ocean thermal energy conversion system. The first fluid may therefore be cold sea water or hot water. Preferably, the first fluid consists of hot water situated at the surface of the sea or at a very shallow depth. In one embodiment, the heat exchangers 110a, 110b may be plate heat exchangers.

As is well known, plate heat exchangers consist of a plurality of parallel plates which define a plurality of passages of a generally flat form. These passages are delimited by spacer webs and contain spacer corrugations. The entire heat exchanger is assembled by brazing in a furnace. The input-supply and output-discharge for each passage is effected by means of generally semi cylindrical collectors welded on to the surfaces of the exchanger.

Heat exchangers 110a, 110b are arranged at the same level and a distribution chamber 130 is disposed between the two, in particular for supplying the first fluid to the two heat exchangers 110a, 110b.

The distribution chamber 130 is connected respectively to the first exchanger 110a and to the second exchanger 110b by fluid connections. It has a suction opening 131 in the direction of the fluid reservoir 120 to draw the first fluid into the distribution chamber 130 and to distribute it in the first exchanger 110a and the second exchanger 110b. In this embodiment, a suction pipe 132 extends from the suction opening 131 downwards, for example for passing below the surface 121 of the first fluid present in the reservoir 120 (see for example FIG. 3). As shown, the suction pipe 132 may be in the form of a suction bell widening at the lower end 134 of the pipe, which is immersed in the first fluid.

Figure 4:
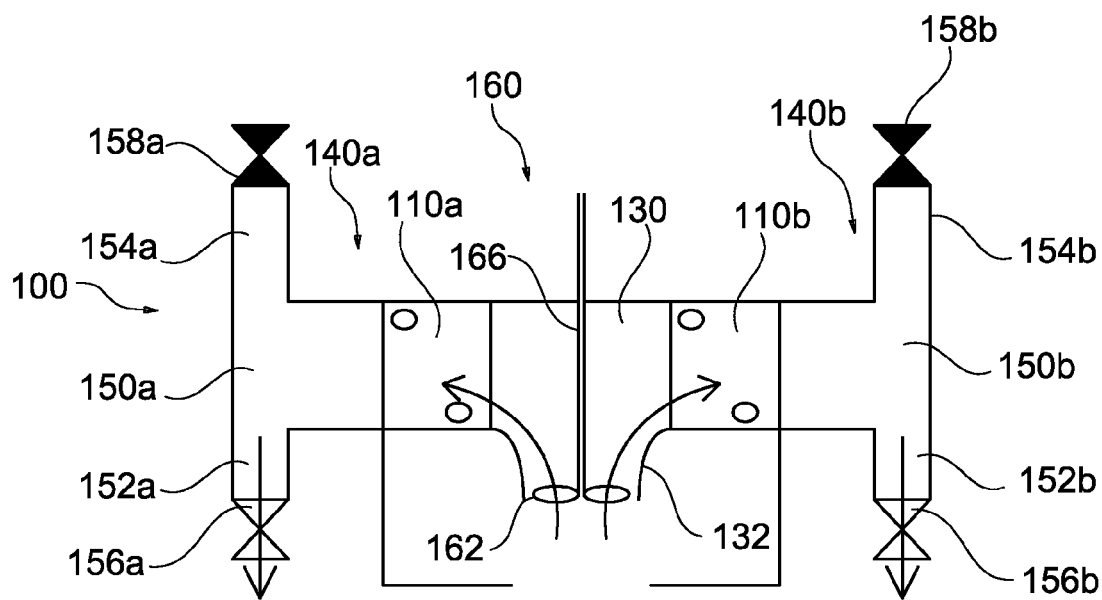
FIG. 4 is a schematic representation of an exchanger module of another embodiment in a regular operating mode.
Figure 5:
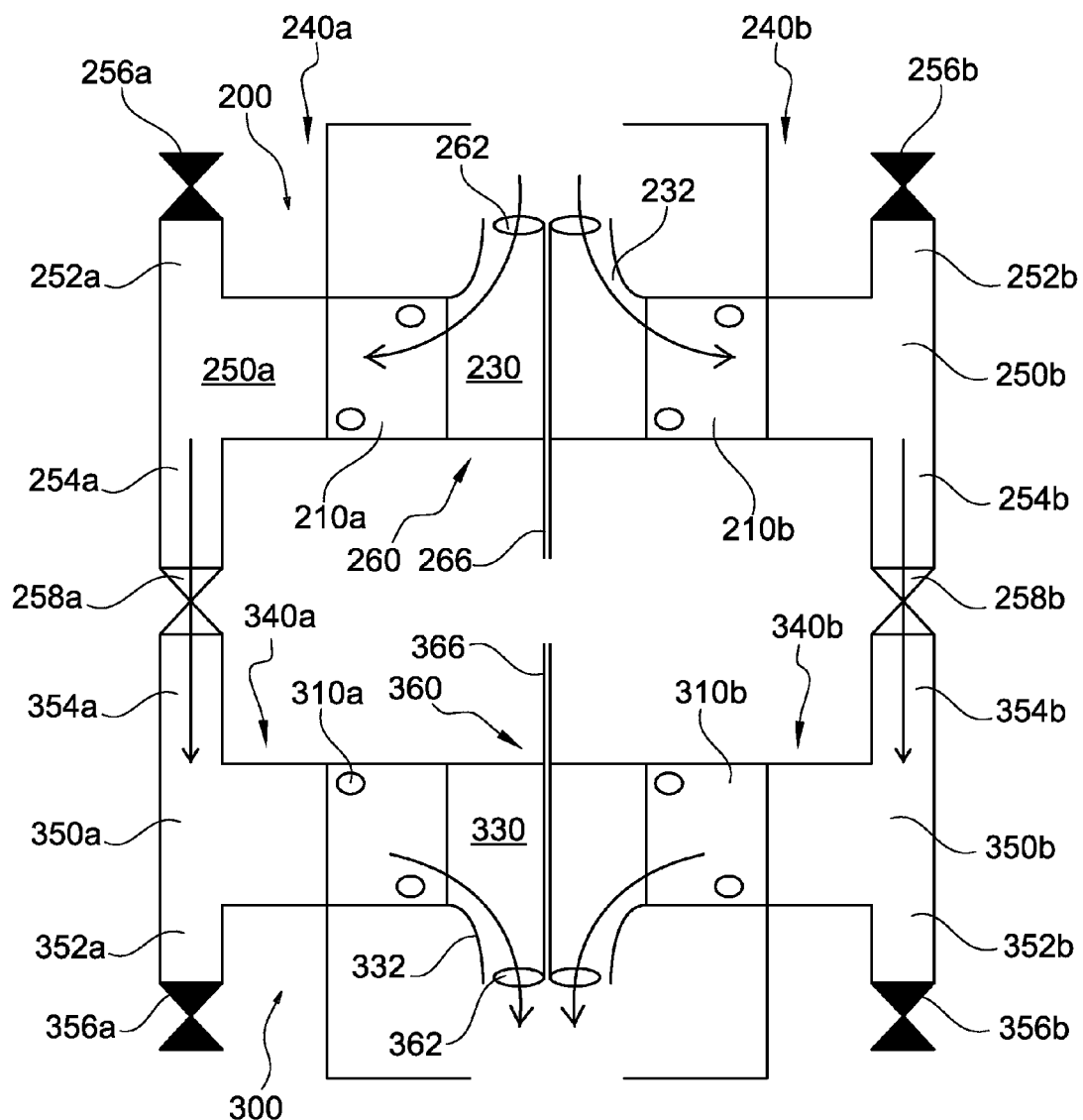
FIG. 5 is a schematic representation of two exchanger modules pooled together in a first cleaning mode according to an embodiment.
Figure 6:
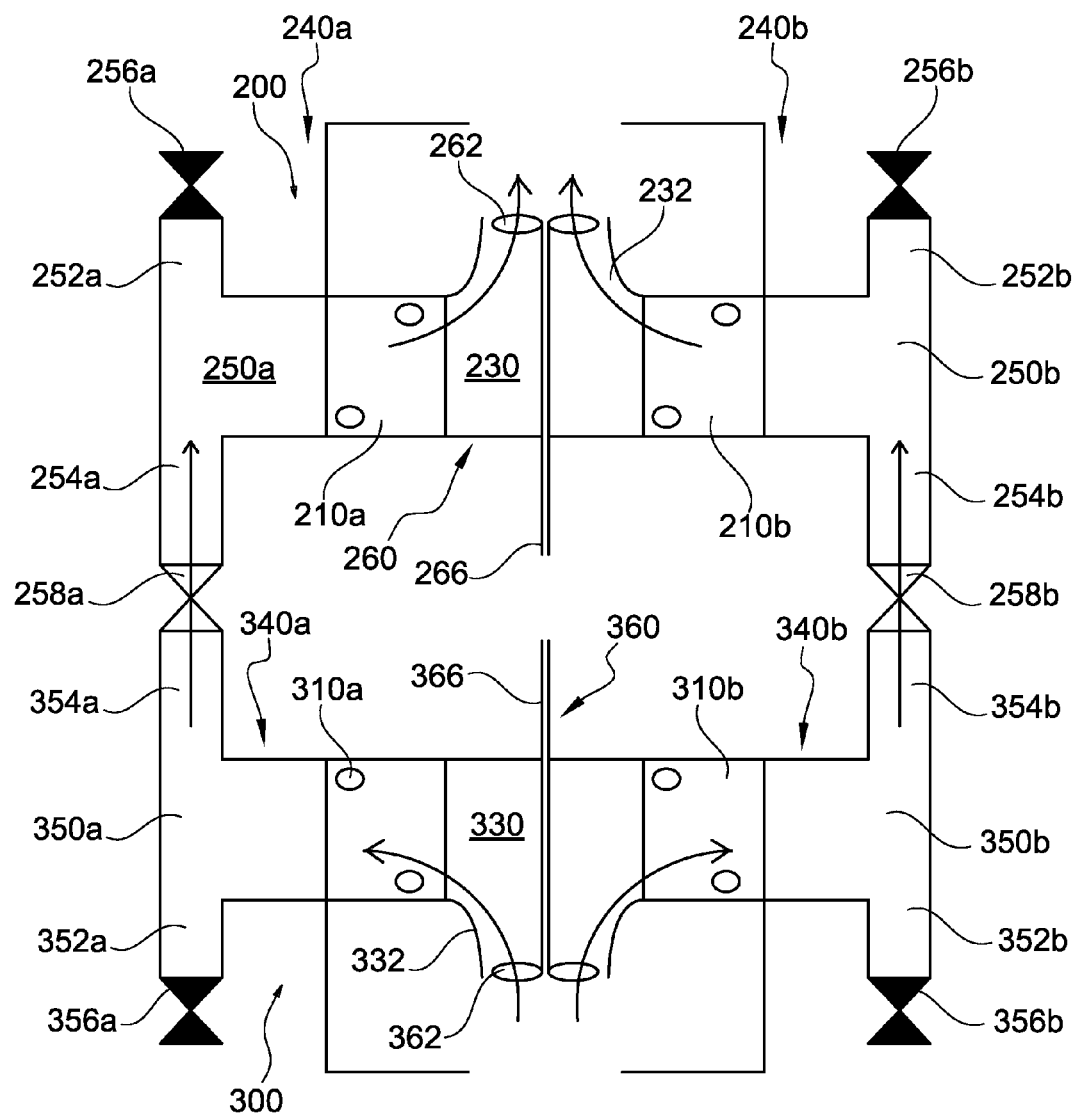
FIG. 6 is a representation of the two exchanger modules pooled together according to FIG. 5 in a second cleaning mode.

FIG. 4 is a schematic representation of an exchanger module in a nominal operating mode. The module 100 includes the first two circuits 140a, 140b which are arranged in parallel. Each first circuit exchanges or transfers heat in the heat exchanger 110a, 110b, with or to a second fluid which flows in a second circuit, not shown. The first circuit 140a, 140b includes, inter alia, the suction pipe 132, the distribution chamber 130, the respective heat exchanger 110a, 110b, and an outlet chamber 150a, 150b which is connected to an outlet pipe 152a, 152b. Moreover, the outlet chamber 150a, 150b is connected to a connection pipe 154a, 154b in order to connect the exchanger module 100, in particular one of the first circuits 140a, 140b of this module 100, with another exchanger module, in particular with the first circuit of another exchanger module, for example as shown in FIGS. 5 and 6. The outlet chamber 150a, 150b may also be designed in the form of a bifurcation of pipes.

The outlet pipes 152a, 152b are respectively provided with a valve 156a, 156b which may be opened or closed temporarily. The connecting pipes 154a, 154b are also respectively provided with an isolation valve 158a, 158b which may be opened temporarily. In the regular or nominal mode of operation, the outlet valves 156a, 156b are open and the isolation valves 158a, 158b are closed. In FIGS. 4 to 6, the white valves signify open valves and the black valves signify closed valves.

The exchanger module 100 has a pump 160. The pump 160 includes a device for driving water 162, for example a propeller, which is arranged in the suction pipe 132 or in the suction opening 131 of the distribution chamber 130. The drive device is not limited to a propeller: other embodiments of the pump to drive the first fluid may be used, for example centrifugal rotary pumps. In the embodiment shown in the Figures, an axial rotary pump is used. The drive device 162 is operated by a motor 164 via a shaft 166. The motor 164 is arranged above the distribution chamber 130 and the drive device 162 is arranged at the bottom or below this chamber. In this way, the shaft 166 traverses the chamber 130, for example vertically. Another motion transmission device may, for example, be a device for transmission of a linear motion. A sealed bearing of the shaft 166 may be provided in a wall of the chamber 130. The motor 164 of the pump 160 is easily accessible for maintenance. In the regular mode of operation, the first fluid is then sucked by the pump 160, in particular by the drive device 162, and pushed to one and/or the other heat exchanger 110a, 110b and passes through the outlet chamber 150a, 150b, the outlet pipe 152a, 152b and the outlet valve 156a, 156b, and is discharged outside of the exchanger module, for example, in the sea or in a water treatment device.

In FIG. 4, the arrows indicate the direction of the main flow direction of the first fluid, here the flow of sea water. The main flow direction is the direction of flow of the first fluid during operation of the thermal energy system in the regular operating mode. As indicated above, the heat exchangers may be condensers or evaporators depending on whether the first fluid is hot fluid or cold fluid. In FIG. 3, the feed pump 160 is set to suck the first fluid in a reservoir 120 or in a pool. The shaft 166 of the pump 160 traverses through the distribution chamber and the first fluid is thus drawn in and then distributed around the shaft 166 of the pump 160 to the heat exchanger lines 110a, 110b. Once the fluid has passed through the first heat exchanger, it is collected at the outlet chamber 150a, 150b.

In an embodiment, as can be seen in FIG. 3, a filtration device 122 extends from the exterior walls 136 of the distribution chamber 130 downwards or towards a bottom 124 of the first fluid reservoir 120. For example, the filtration device 122 has a cylindrical shape extending around the suction opening 131 or around the suction pipe 132. In this manner, the filtration is carried out by way of a filtering surface encompassing the suction pipe 132 or the suction umbrella of the pump 160. When the reservoir for the first fluid 120 is emptied of the first fluid, it is possible to clean the filtration device because it is possible to access both the interior of the volume of filter and the exterior of this volume.

In embodiment shown in FIG. 3, the filtration device is fixed to the bottom 124 of the suction reservoir and to a lower wall of the exchanger module 100, for example of the distribution chamber 130 or the heat exchangers 110a, 110b. However, there may be other possibilities for developing a filtration device that offers a large filtering surface. For example, it is possible to construct a rigid cage around the pump and to fix a filtering means to this cage. In this way, the suction pipe 132 may also be immersed in the open sea, for example so as to draw in the hot sea water. In the case of FIG. 3, the filtration device is located in the suction pool and may have a large filtering surface in order to limit the pressure losses induced. The large surface of the filters makes it possible to further extend the interval periods between the cleaning of these filters, and consequently increase the availability of the ocean thermal energy conversion system.

FIGS. 5 and 6 show schematically a thermal energy system including two exchanger modules 200, 300 having similar or identical functions, namely a first exchanger module 200 and a second exchanger module 300. Each module 200, 300 is similar to the exchanger module in FIG. 4. In this way the reference numbers of the first module 200 are increased by 100 compared to those in FIG. 4 and the reference numbers of the second module 300 are increased by 200 compared to those of FIG. 4. Other embodiments may include, for example, three or more than three exchanger modules.

The first module 200 and the second module 300 are connected to each other in a manner such that fluid can pass from the outlet chamber 250a, 250b of the first module 200 to the outlet chamber 350a, 350b of the second exchanger module 300 through the isolation valves 258a, 258b. These valves 258a, 258b are elements that are common to both modules 200, 300.

In the regular mode of operation that is shown in FIG. 4, the isolation valves 258a, 258b are closed and the outlet valves 256a, 256b, 356a, 356b are open. In this way, each exchanger module 200, 300 operates independently of one another or in parallel. In addition, each exchanger module 200, 300 has its own first fluid reservoir, not shown in FIGS. 4 to 6.

In the cleaning mode, it is possible to connect the first module 200 and the second module 300 in series by an opening of the isolation valves 258a, 258b. Thus, based on the assumption that the modules of an ocean thermal energy conversion plant are arranged in parallel and separated by isolation valves 258a, 258b, it is possible to proceed with a countercurrent flow in one of the modules 200, 300.

In the first cleaning mode (FIG. 5), the isolation valves 258a, 258b are opened and the outlet valves and hull valves 256a, 256b, 356a, 356b are closed. The pump of the second module 300 is inactivated and is operating in a controlled back driving mode described below. In this way, the first fluid is sucked in by the pump of the first module 200, traverses through the distribution chamber 230, the heat exchangers 210a, 210b of the first module, the outlet chambers 250a, 250b and the respective connection pipes 254a, 254b in order to pass the isolation valves 258a, 258b and the respective connection pipes 354a, 354b, the respective outlet chambers 350a, 350b of the second module 300 in the direction opposite to the main flow direction, the respective heat exchangers 310a, 310b of the second exchanger module 200 in the direction opposite to the main flow direction, the distribution chamber 330 and the suction pipe 332 of the second module 300. In this way, the heat exchangers 310a, 310b of the second module 300 are traversed by the first fluid in the direction opposite to the main flow direction. Thus it is possible to unclog the heat exchangers 310a, 310b of the second exchanger module 300. The suction pump of the first module operates at the nominal speed, as in the regular mode of operation. The isolation valves 258a, 258b are opened and the water is pushed in a counter current flow into the heat exchangers of the second module 300. The pump of the second module 300 is stopped and driven by the flow in the opposite direction. For reference, the pump of the second module 300 is controlled as to its speed so as not to exceed a predetermined speed, for example, in order to not exceed its absolute nominal rotation speed. This is what is known as the controlled back driving mode of operation. In cleaning mode, the thermal energy system is not stopped and is still generating energy, however the system efficiency is reduced during this cleaning mode.

FIG. 6 shows the thermal energy system in a second cleaning mode. In this second cleaning mode the valves are in the same condition as in FIG. 5 but it is the pump of the second exchanger module 300 operating at rated speed, while the pump of the first module 200 is stopped and driven by the flow in reverse direction and at controlled speed, in the controlled back driving mode.

In this way, the heat exchangers 210a, 210b, 310a, 310b of the first module 200 and of the second module 300 are connected in series in order to effect cleaning, in the first cleaning mode of the heat exchanger 310a, 310b of the second module 300, and in the second cleaning mode of the heat exchangers 210a, 210a of the first exchanger module 200. In the cleaning mode, the first fluid passes into the first circuit of the first exchanger module as in the regular mode of operation, and passes into the second heat exchanger in the direction opposite to the main flow direction. In the second cleaning mode, the fluid traverses through both exchanger modules in reverse flow direction.

The invention claimed is:

1. A thermal energy system comprising at least two exchanger modules, each exchanger module including i) at least one heat exchanger, ii) at least a first circuit for a first fluid traversing, in a regular mode of operation, through the heat exchanger in a main flow direction, iii) a second circuit for a second fluid for exchanging thermal energy between the first fluid and the second fluid, and iv) at least one pump including a fluid drive device for driving the first fluid in the main flow direction, wherein the drive device is arranged, along the main flow direction, upstream of the at least one heat exchanger, and wherein the system is adapted to connect in series, in a cleaning mode, the first circuits of at least two exchanger modules in a manner such that the first fluid traverses through at least the first circuit of one of the exchanger modules in the main flow direction and traverses through at least the first circuit of another exchanger module in a direction opposite to the main flow direction.

2. A system according to claim 1, characterised by a distribution chamber arranged, along the main flow direction, downstream from the drive device and upstream of the at least one heat exchanger.

3. A system according to claim 2, characterised in that a suction pipe extends from the distribution chamber.

4. A system according to claim 3, characterised in that the suction pipe has a length that is less than 4 times its nominal diameter.

5. A system according to claim 2, characterised in that the distribution chamber is arranged at least partially above a reservoir for the first fluid.

6. A system according to claim 2, characterised in that the pump includes a motor connected to the drive device by a motion transmission device, which traverses at least partially through the distribution chamber.

7. A system according to claim 1, characterised in that a filtering means is arranged, along the main flow direction, upstream of the drive device.

8. A system according to claim 1, characterised in that at least one of the heat exchangers is of the plate heat exchanger type.

9. A system according to claim 1, characterised in that an isolation valve is arranged, along the main flow direction, in the first circuits connected in series, downstream from the heat exchangers, in a manner so as to allow communication between the first circuits of the at least two exchanger modules.

10. A system according to claim 1, characterised in that each first circuit includes an outlet valve, by way of which, in the regular operating mode, the first fluid is discharged out of the respective exchanger module.

11. A system according to claim 1, characterised in that at least two modules have identical functions.

12. A method for operating a thermal energy system, the thermal energy system comprising at least two exchanger modules, each exchange module including at least one heat exchanger, at least a first circuit for a first fluid traversing, in a regular mode of operation, through the heat exchanger in a main flow direction, a second circuit for a second fluid for exchanging thermal energy between the first fluid and the second fluid, and at least one pump including a fluid drive device for driving the first fluid in the main flow direction, characterised in that the drive device is arranged, along the main flow direction, upstream of the heat exchanger, wherein
    the system is adapted to connect in series, in a cleaning mode, the first circuits of at least two exchanger modules in a manner such that the first fluid traverses through at least a first circuit of one of the exchanger modules in the main flow direction and traverses through at least a first circuit of another exchanger module in a direction opposite to the main flow direction, the method including the following steps:
    the driving, along the main flow direction, of the first fluid present upstream of the heat exchanger by the drive device; and
    the activation of a cleaning mode in which the first circuits of at least two exchanger modules are connected in series in a manner such that the first fluid traverses through at least a first circuit of one of the exchanger modules in the main flow direction and traverses through at least a first circuit of another exchanger module in a direction opposite to the main flow direction.

13. A method according to claim 12, characterised in that the activation of the cleaning mode includes:
    the opening of at least one isolation valve arranged in the first circuits connected in series, along the main flow direction, respectively downstream from the two heat exchangers in a manner so as get said first circuits to communicate.

14. A method according to claim 12, characterised in that each first circuit includes an outlet valve, by way of which, in the regular operating mode, the first fluid is discharged out of the respective exchanger module, the activation of the cleaning mode including the closure, in each first circuit, of the outlet valve.

15. A method according to claim 12, further including in the cleaning mode of the inactivation of one of the pumps associated with the exchanger modules including the first circuits connected in series.

16. A method according to claim 15, further including of the following steps:
    determination of the speed of the inactive pump,
    comparison of this speed with a predetermined reference speed, and
    restriction of the speed of the inactive pump to the predetermined reference speed.

17. A method according to claim 12, characterised in that the cleaning mode is activated for a predetermined time period.

* * * * *